United States Patent
Chang et al.

(10) Patent No.: US 11,720,808 B2
(45) Date of Patent: Aug. 8, 2023

(54) FEATURE REMOVAL FRAMEWORK TO STREAMLINE MACHINE LEARNING

(71) Applicant: Microsoft Technology Licensing, LLC, Redmond, WA (US)

(72) Inventors: Yen-Jung Chang, Santa Clara, CA (US); Yunsong Meng, Cupertino, CA (US); Tie Wang, Cupertino, CA (US); Yang Yang, Fremont, CA (US); Bo Long, Palo Alto, CA (US); Boyi Chen, Santa Clara, CA (US); Yanbin Jiang, Sunnyvale, CA (US); Zheng Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 505 days.

(21) Appl. No.: 16/886,316

(22) Filed: May 28, 2020

(65) Prior Publication Data
US 2021/0374562 A1    Dec. 2, 2021

(51) Int. Cl.
*G06N 5/04*    (2023.01)
*G06N 20/00*    (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | | |
|---|---|---|---|---|
| 2014/0372441 A1* | 12/2014 | Kanungo | ............... | G06F 16/288 707/737 |
| 2017/0046510 A1* | 2/2017 | Chen | ...................... | G06F 21/552 |
| 2019/0188531 A1* | 6/2019 | Ozcaglar | ............... | G06K 9/6219 |
| 2019/0361985 A1* | 11/2019 | Roustant | ........... | G06F 16/24578 |
| 2020/0050968 A1* | 2/2020 | Lee | ......................... | G06N 20/00 |
| 2020/0057960 A1* | 2/2020 | Aminzadeh | ............ | G06N 7/005 |
| 2021/0073644 A1* | 3/2021 | Lin | ........................... | G06N 3/04 |
| 2021/0097329 A1* | 4/2021 | Jia | ........................ | G06K 9/6256 |
| 2021/0342735 A1* | 11/2021 | Kartoun | ................. | G06N 20/00 |
| 2021/0350273 A1* | 11/2021 | Huu | ....................... | G06N 3/084 |

OTHER PUBLICATIONS

Madbouly, "Relevant Feature Selection Model Using Data Mining for Intrusion Detection System", International Journal of Engineering Trends and Technology (IJETT)—vol. 9 No. 10—Mar. 2014. (Year: 2014).*

* cited by examiner

*Primary Examiner* — Dave Misir
(74) *Attorney, Agent, or Firm* — Nicholson De Vos Webster & Elliott LLP (57) ABSTRACT

The disclosed embodiments provide a system for streamlining machine learning. During operation, the system determines a resource overhead for a baseline version of a machine learning model that uses a set of features to produce entity rankings and a number of features to be removed to lower the resource overhead to a target resource overhead. Next, the system calculates importance scores for the features, wherein each importance score represents an impact of a corresponding feature on the entity rankings. The system then identifies a first subset of the features to be removed as the number of features with lowest importance scores and trains a simplified version of the machine learning model using a second subset of the features that excludes the first subset of the features. Finally, the system executes the simplified version to produce new entity rankings.

20 Claims, 5 Drawing Sheets

FEATURE REMOVAL FRAMEWORK TO STREAMLINE MACHINE LEARNING

BACKGROUND

Field

The disclosed embodiments relate to machine learning. More specifically, the disclosed embodiments relate to a feature removal framework to streamline machine learning.

Related Art

Analytics are commonly used to discover trends, patterns, relationships, and/or other attributes related to large sets of complex, interconnected, and/or multidimensional data. In turn, the discovered information is used to derive insights and/or guide decisions or actions related to the data.

To glean such insights, large datasets of features are analyzed using regression models, artificial neural networks, support vector machines, decision trees, naïve Bayes classifiers, and/or other types of machine learning models. The discovered information can then be used to guide decisions and/or perform actions related to the data. For example, the output of a machine learning model may be used to guide marketing decisions, assess risk, detect fraud, predict behavior, and/or customize or optimize use of an application or website.

However, significant time, effort, and overhead are spent on selecting and processing features during training and execution of machine learning models for analytics. For example, a data set for a machine learning model may have thousands to millions of features, including features that are created from combinations of other features, while only a fraction of the features and/or combinations may contribute significantly to the output of the machine learning model. At the same time, training and/or execution of machine learning models with large numbers of features and/or large data sets typically require more memory, computational resources, and time than machine learning models with smaller numbers of features or data sets.

The use of complex machine learning models with large data sets and/or numbers of features presents additional challenges in online environments, where machine learning output is generated in a real-time or near-real-time basis (e.g., in response to recent user actions or newly received data). For example, an online system uses machine learning models to generate scores that are used to select and display products, services, goods, and/or other entities to users while the users interact with the online system. When a request for these scores is received, a service in the online system retrieves features as input to one or more machine learning models, applies the machine learning models to the features to generate the scores, and returns the scores in response to the request. The service is additionally required to respond to the request within the latency limit specified in a service level agreement (SLA) for the service. As a result, the service may have difficulty scaling and/or meeting the latency requirement as the number of features used by the model(s), the number of requests, and/or the number of scores produced in response to each request increase.

Consequently, machine learning and/or analytics may be facilitated by mechanisms for improving resource consumption, latency, and/or scalability associated with executing machine learning models.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for reducing resource overhead in training and/or executing machine learning models. These machine learning models include, but are not limited to, tree-based models, deep learning models, stacked/ensemble models, regression models, and/or other types of machine learning models that are used to generate rankings of entities. For example, one or more of these machine learning models are used to produce, for each user that accesses an online system, scores by which content items (e.g., articles, posts, goods, services, users, jobs, etc.) are ranked. The ranked content items are then outputted to the user in a content feed, search results, recommendations, and/or in another format supported by the online system.

More specifically, the disclosed embodiments provide a feature removal framework that selectively removes features from machine learning models, which reduces latency, processor usage, memory usage, garbage collection, and/or other types of resource overhead during retrieval and calculation of features inputted into the machine learning models and subsequent execution of the machine learning models using the features.

In some embodiments, the feature removal framework performs feature removal for a "baseline" version of a machine learning model. For example, the baseline version includes a version of the machine learning model that is currently deployed in a production and/or real-world environment. In this environment, the baseline version can be executed on a real-time or near-real-time basis to perform inference, prediction, and/or other types of analysis based on up-to-date values of the features. As features are added to the baseline version (e.g., in changes to the baseline version over time), the resource overhead involved in executing the baseline version increases.

To improve the resource overhead of the machine learning model, the feature removal framework calculates an importance score for each feature (or group of features) inputted into the baseline version and removes one or more features with importance scores that are lower than a threshold from the baseline version. For example, each importance score represents the aggregated impact of a feature (or group of features) on rankings outputted by the baseline version of the machine learning model over a period of time (e.g., a number of days of weeks). To calculate the importance score, "original" rankings produced by the baseline version from multiple sets of feature values (e.g., from records in a training, test, or validation dataset for the machine learning model) are obtained. Within each set of features, a feature value (or multiple feature values) for each feature (or group of features) is modified by replacing the feature value with a "default" missing value that minimizes or removes the feature's contribution to the output of the machine learning model and/or with a feature value from another set of feature values (e.g., another record in the dataset), and the baseline version is applied to each set of feature values with modifications to produce a "modified" ranking. A rank-biased overlap (or another measure of rank-based similarity) is calculated between each original ranking produced by the baseline version from a set of feature values and a corresponding modified ranking outputted by the baseline version after one or more feature values in the set have been modified. Values of the measure for the sets of features are then aggregated into an importance score for the modified feature value(s).

Next, the feature removal framework identifies a subset of features with lowest important scores for removal from the machine learning model and trains a "simplified" version of the machine learning model from remaining features that exclude the identified subset of features. For example, the feature removal framework sets a numeric and/or quantile threshold for importance scores for features inputted into the baseline version. The feature removal framework then trains the simplified version using features in the baseline version that meet or exceed the threshold. In other words, the simplified version lacks features in the baseline version that have less than a threshold impact on rankings outputted by the baseline version.

In some embodiments, the threshold for removing features from the baseline version is selected to lower a resource overhead of the baseline version to a target resource overhead for the machine learning model. For example, the latency, processor consumption, memory usage, GC duration, and/or another measure of resource overhead is estimated for a single feature used by the machine learning model by training and executing different versions of the machine learning model using different numbers of features, determining the resource overhead of each version, and calculating a "typical" (e.g., average, median, etc.) per-feature resource overhead by dividing a difference in resource overhead between two versions of the machine learning model by the difference in the number of features between the versions. The per-feature resource consumption is then used to estimate the number of features to be removed from the baseline version to lower the resource consumption to a target resource consumption for the machine learning model, and the simplified version is created to exclude the estimated number of features with the lowest importance scores.

The feature removal framework additionally includes functionality to manage the retraining and/or execution of the simplified version based on comparisons of the performances of the baseline and simplified versions. For example, the feature removal framework uses an online and/or offline experiment to calculate and compare one or more performance metrics between the baseline and simplified versions. If the experiment determines that the simplified version has a statistically significant lower performance than the baseline version, the simplified version is retrained using fewer removed features. Conversely, if the simplified version does not have a statistically significant lower performance than the baseline version, execution of the baseline version in the production environment is increasingly replaced with execution of the simplified version (e.g., by increasing production traffic to the simplified version and decreasing production traffic to the baseline version).

By replacing the baseline version of the machine learning model with a simplified version that uses a smaller numbers of features, the disclosed embodiments reduce resource consumption associated with retrieving, calculating, and/or otherwise processing features inputted into the machine learning model, as well as subsequent execution of the machine learning model using the features' values. In turn, computer systems, clusters, and/or other collections of resources on which the machine learning model executes are able to process requests for scores or rankings from the machine learning model more quickly and/or handle greater volumes of these requests. At the same time, selective execution of the simplified version based on comparisons of performance metrics between the baseline and simplified versions ensures that the simplified version does not negatively impact outcomes and/or goals related to use of the machine learning model.

In contrast, conventional techniques frequently add features to machine learning models over time without monitoring the impact of individual features on the output and/or performance of the machine learning models. Such retention of features increases the complexity and/or resource consumption of the machine learning models and negatively impacts the scalability and/or latency associated with processing requests for scores or rankings from the machine learning models. Thus, by removing features from machine learning models in a way that meets resource overhead targets and/or minimizes the performance impact on the machine learning models, the disclosed embodiments improve computer systems, workflows, tools, and/or technologies related to monitoring, training, executing, and updating machine learning models.

Feature Removal Framework to Streamline Machine Learning

Figure 1:
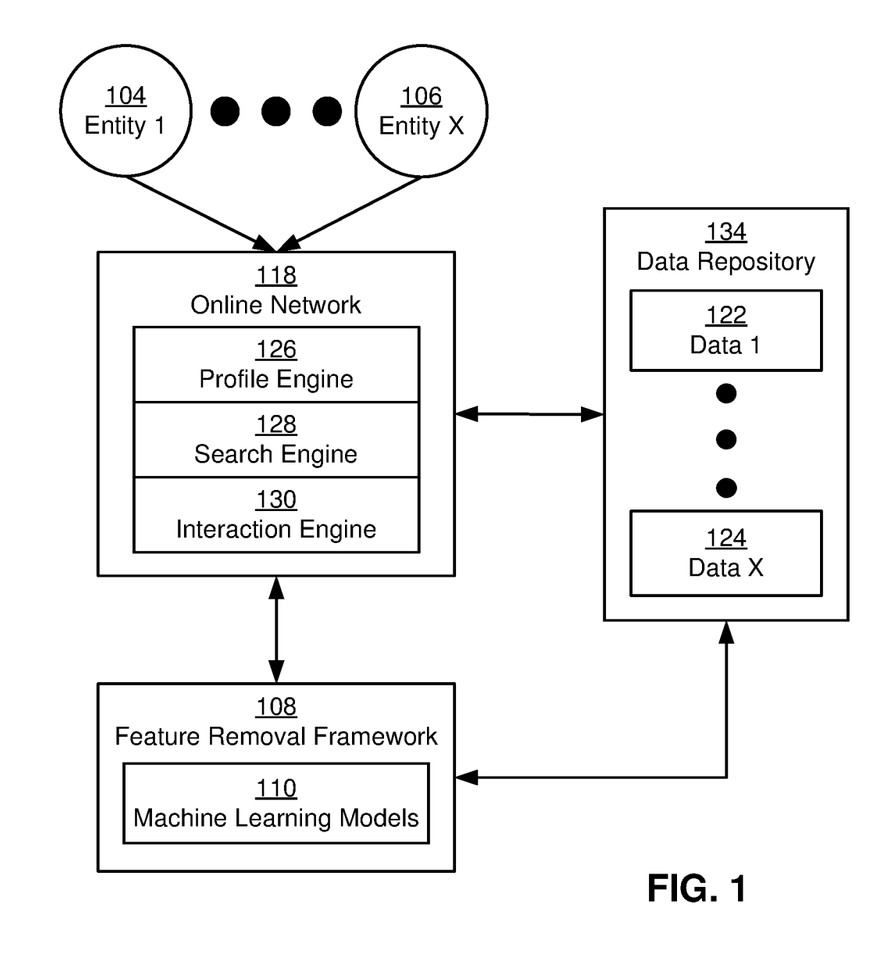
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile engine 126 that allows the entities to create and edit profiles containing information related to the entities' professional and/or industry backgrounds, experiences, summaries, job titles, projects, skills, and so on. Profile engine 126 also allows the entities to view the profiles of other entities in online network 118.

Profile engine 126 also, or instead, includes mechanisms for assisting the entities with profile completion. For example, profile engine 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search engine 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction engine 130 that allows the entities to interact with one another on online network 118. For example, interaction engine 130 may allow a user, company, school, or other entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or features. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is logged and stored in a database, data warehouse, cloud storage, and/or other data-storage mechanism providing data repository 134.

Data in data repository 134 may then be used to generate recommendations and/or other insights related to users, companies, schools, jobs, groups, and/or other entities in online network 118. In some embodiments, one or more components of online network 118 log searches, clicks, views, text input, conversions, and/or other feedback during the entities' interaction with a job search tool in online network 118. The feedback may be stored in data repository 134 and used as training data for one or more machine learning models 110, and the output of the machine learning model(s) may be used to display and/or otherwise recommend jobs, advertisements, posts, articles, connections, products, companies, groups, and/or other types of content, entities, or actions to members of online network 118.

In some embodiments, data in data repository 134 and one or more machine learning models 110 are used to produce rankings of candidates for jobs or opportunities listed within or outside online network 118. The candidates include users who have viewed, searched for, or applied to jobs, positions, roles, and/or opportunities, within or outside online network 118. The candidates also, or instead, include users and/or members of online network 118 with skills, work experience, and/or other attributes or qualifications that match the corresponding jobs, positions, roles, and/or opportunities.

After the candidates are identified, profile and/or activity data of the candidates are inputted into the machine learning model(s), along with features and/or characteristics of the corresponding opportunities (e.g., required or desired skills, education, experience, industry, title, etc.). The machine learning model(s) output scores representing the strength of the candidates with respect to the opportunities and/or qualifications related to the opportunities (e.g., skills, current position, previous positions, overall qualifications, etc.). That is, the machine learning model(s) generate scores based on similarities between the candidates' profile data with online network 118 and descriptions of the opportunities. The model(s) optionally adjust the scores based on social and/or other validation of the candidates' profile data (e.g., endorsements of skills, recommendations, accomplishments, awards, etc.). The machine learning model(s) also, or instead, generate scores representing the candidates' level of interest in the opportunities.

Rankings and/or associated insights based on the scores are then used to improve the quality of the candidates and/or recommendations of opportunities to the candidates, increase user activity with online network 118, and/or guide the decisions of the candidates and/or moderators involved in screening for or placing the opportunities (e.g., hiring managers, recruiters, human resources professionals, etc.). For example, one or more components of online network 118 display and/or otherwise output a member's position (e.g., top 10%, top 20 out of 138, etc.) in a ranking of candidates for a job to encourage the member to apply for jobs in which the member is highly ranked. In a second example, the component(s) account for a candidate's relative interest and/or strength with respect to a set of jobs during ordering of the jobs as search results and/or job recommendations that are subsequently displayed to the candidate. In a third example, the component(s) recommend highly ranked candidates for a position to recruiters and/or other moderators as potential applicants and/or interview candidates for the position. In a fourth example, the component(s) recommend jobs to a candidate based on the predicted relevance or attractiveness of the jobs to the candidate and/or the candidate's likelihood of applying to the jobs.

In one or more embodiments, online network 118 includes functionality to execute machine learning models 110 and generate scores and/or rankings related to candidates, opportunities, and/or other entities in a real-time, near-real-time, or on-demand basis. In these embodiments, the scores and/or rankings are generated in response to recent activity or actions by or involving the entities.

For example, online network 118 includes a service that uses a machine learning model to generate a set of relevance scores representing the compatibility of a user with a set of jobs (or the compatibility of a set of users as candidates for a job). The service receives a scoring request in response to the user's job search (or a recruiter's search for candidates matching a job), the user accessing a job recommendation component in online network 118, and/or the user otherwise interacting with job-related functionality in online network 118. To improve the accuracy of the scores, the service inputs, into the machine learning model, features that reflect the latest activity by the user (or recruiter), such as features representing the user's searches, clicks, likes, dislikes, and/or other actions performed in the same user session as the user's interaction with the job-related functionality. In response to the inputted features, the machine learning model calculates the relevance scores between the user and jobs (or a set of candidates and a job) in a real-time or near-real-time basis (e.g., with a latency that is within a limit specified in a service level agreement (SLA) for the service). The service returns the relevance scores in a response to the scoring request, and online network 118 outputs, to the user, a ranking of jobs (or candidates) by descending relevance score as search results, recommendations, and/or other representations of the jobs (or candidates).

Those skilled in the art will appreciate that online network 118 may perform on-demand scoring and/or ranking related to other types or combinations of entities. For example, online network 118 may receive one or more scoring requests for relevance scores between a user and content items created and/or shared by other users of the online network 118. These content items include, but are not limited to, posts, articles, comments, updates, and/or videos. The scoring request(s) may be generated in response to the user accessing a content feed in a homepage, landing page, and/or another part of online network 118. In response to the scoring request(s), a first set of machine learning models 110 is executed to generate recommendations of specific types of content (e.g., network updates, jobs, articles, courses, advertisements, posts, products, connections, products, etc.) for the user based on attributes of the user, recent activity by the user and/or similar users, and/or attributes of the content. The first set of machine learning models 110 output scores representing predictions of the user's level of interest in the content, and a subset of content items with high scores from the first set of machine learning models 110 is selected. Features associated with the user and the selected content items are inputted into one or more additional machine learning models 110, and the additional machine learning model(s) generate an additional set of scores representing predicted likelihoods of the user performing certain actions on (e.g., clicking, liking, commenting on, sharing, etc.) the selected content items. The content items are ranked by descending score, and one or more rules, filters, and/or exceptions are used to update the ranking (e.g., based on business requirements, member preferences, impression discounting, diversification of content, and/or other goals, strategies, or priorities). Finally, the updated ranking is displayed in a content feed for the user. Because the content items are scored and ranked in real-time or near-real-time, the content feed is able to reflect the latest content posted to online network 118 and/or user interactions with the content in online network 118.

In another example, online network 118 may generate a scoring request for relevance scores between a user and other registered users of online network 118 in response to the user accessing a "People You May Know" feature in online network 118. A service processes the scoring request by executing one or more machine learning models 110 that generate relevance scores between the user and the other registered users based on features that include the user's latest set of connections and/or connection requests in online network 118. The other registered users are then ranked by descending relevance score, and the ranking is outputted as connection recommendations to the user within the "People You May Know" feature.

In one or more embodiments, a feature removal framework 108 provided by and/or executing in conjunction with online network 118 includes functionality to reduce latency and/or other types of resource overhead in executing machine learning models 110. As described in further detail below, feature removal framework 108 identifies, for a given machine learning model, a subset of features that have less than a threshold impact on rankings outputted by the machine learning model. Feature removal framework 108 then trains a "simplified version" of the machine learning model without the identified features, thereby removing the features from the machine learning model in a way that minimizes the impact on the performance of the machine learning model. Feature removal framework 108 then deploys and executes the simplified version as a substitute for the original machine learning model, which reduces latency, processor usage, memory usage, garbage collection duration, and/or other resource overhead associated with retrieving and/or calculating features inputted into the machine learning model, as well as executing the machine learning model using the features.

Figure 2:
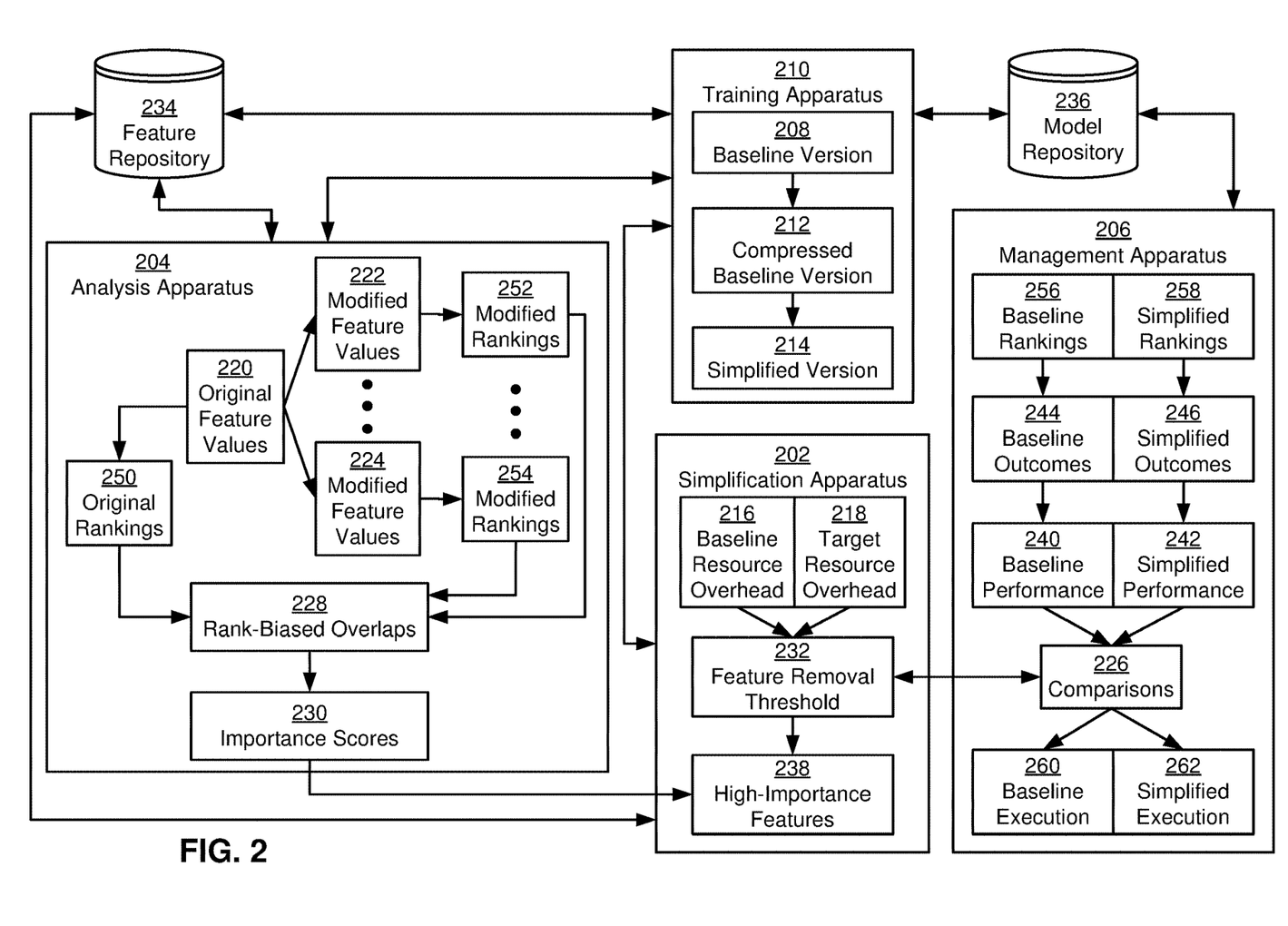
FIG. 2 shows a feature removal framework in accordance with the disclosed embodiments.

FIG. 2 shows a feature removal framework (e.g., feature removal framework 108 of FIG. 1) in accordance with the disclosed embodiments. As shown in FIG. 2, the feature removal framework includes a simplification apparatus 202, an analysis apparatus 204, a management apparatus 206, and a training apparatus 210. Each of these components is described in further detail below.

Analysis apparatus 204 calculates importance scores 230 representing the impact of individual features or groups of features on rankings outputted by a version of a machine learning model. In one or more embodiments, analysis apparatus 204 calculates importance scores 230 for a baseline version 208 of the machine learning model that is deployed in a production environment to which end users are exposed. Within the production environment, baseline version 208 may be executed on a real-time or near-real-time basis to perform inference, prediction, and/or other types of analysis based on up-to-date values of features from a feature repository 234. As features are added to baseline version 208 (e.g., as the features become available and/or during iterative updates to baseline version 208), a baseline resource overhead 216 associated with executing baseline version 208 to process requests for scores produced by the baseline version increases.

In some embodiments, the machine learning model includes a "ranking model" that produces rankings that are outputted to users of an online system, such as online network 118 of FIG. 1. For example, the machine learning model generates scores by which recommendations, search results, and/or other types of entities are ranked for a given user. As a result, importance scores 230 are calculated to reflect the effects of the corresponding features on the ordering of entities in a given ranking instead of numeric scores by which the entities are ordered in the ranking.

More specifically, analysis apparatus 204 obtains, from feature repository 234, sets of original feature values 220 from records in a training, test, validation, and/or another dataset used to train and/or evaluate the machine learning model. Analysis apparatus 204 also obtains original rankings 250 produced by baseline version 208 from the sets of original feature values 220. For example, analysis apparatus 204 applies baseline version 208 to original feature values 220 to produce original rankings 250 and/or retrieves original rankings 250 produced during prior training and/or evaluation of the version from feature repository 234 and/or another data store.

Next, analysis apparatus 204 generates modified feature values 222-224 from original feature values 220. In one or more embodiments, each set of original feature values 220 from the dataset is used to generate multiple sets of modified feature values 222-224, with each set of modified feature values containing one or more original feature values 220 that have been replaced with other values. For example, each set of modified feature values 222-224 includes a feature value that has been replaced with a default "missing" value. This "missing" value can include, but is not limited to, a zero numeric value, a mean or median value of the corresponding feature, negative infinity, a "missing" or "other" categorical value that is defined separately from categorical values (e.g., a set of limited values for skills, industries, locations, seniorities, etc.) in a categorical feature, a value randomly selected from a distribution of values for the feature, and/or another value that effectively minimizes or removes the feature's contribution from the output of the version of the machine learning model. The missing value may be set by users responsible for developing or maintaining the machine learning model and/or individual features used by the machine learning model. The missing value is also, or instead, automatically selected by analysis apparatus 204 based on the type of feature (e.g., numeric, categorical, binary, etc.), the type of machine learning model, and/or the distribution of feature values in the feature.

In another example, each set of modified feature values 222-224 includes a feature value that has been randomly swapped with a different feature value for the same feature from a different set of original feature values 220. Such swapping of original feature values 220 across records in the dataset allows sets of modified feature values 222-224 to be produced without introducing "artificial" or anomalous feature values to the sets of modified feature values 222. In a third example, one or more sets of modified feature values 222-224 include multiple features selected by users and/or analysis apparatus 204 (e.g., groups of features that are correlated with one another, groups of semantically related features, groups of randomly selected features, etc.) for which original feature values 220 have been replaced with default or other values.

Analysis apparatus 204 applies baseline version 208 to each set of modified feature values 222-224 to produce a corresponding set of modified rankings (e.g., modified rankings 252-254). For example, analysis apparatus 204 inputs each set of modified feature values 222 into baseline version 208 and obtains a modified ranking corresponding to the set of modified feature values 222 as the output of the version.

Analysis apparatus 204 then calculates a measure of rank similarity between each modified ranking produced from a set of modified feature values (e.g., modified feature values 222-224) and an original ranking produced from a corresponding set of original feature values 220. In one or more embodiments, the measure of rank similarity includes a rank-biased overlap (e.g., rank-biased overlaps 228) that is calculated using the following formulas:

$$I_d = S_{1:d} \cap T_{1:d}$$

$$X_d = |I_d|$$

$$A_d = X_d / d$$

-continued $$RBO(S, T, p) = (1-p)\sum_{d=1}^{n} p^{d-1} A_d$$

In the above formulas, S and T are two rankings, such as the original ranking produced by a version of the machine learning model from a set of original feature values 220 and a modified ranking produced by the same version of the machine learning model from a corresponding set of modified feature values. $I_d$ represents the intersection of the two rankings up to a depth d, $X_d$ represents the size of the intersection up to depth d, and $A_d$ represents the "agreement" of S and T at depth d, which is calculated as the proportion of S and T that overlap at depth d. The rank-biased overlap RBO(S, T, p) is then calculated by scaling the agreement at each depth by a weight $p^{d-1}$ (where 0<p<1), summing the weighted agreements up to a maximum depth of n, and multiplying the result by (1−p). The value of the rank-biased overlap falls in the range [0, 1], where 0 indicates that S and T are disjoint and 1 indicates that S and T are identical.

The parameter p determines the steepness in the decline of the weight as the depth increases: a smaller p results in an increase in the top-weightedness of the ranked-bias overlap. When p=0, only the top-ranked items in the rankings are considered, and the rank-biased overlap is either 0 or 1. Conversely, as p approaches 1, the weights become arbitrarily flat, and the evaluation of the rank-biased overlap becomes arbitrarily deep.

After rank-biased overlaps 228 are calculated between a set of original rankings 250 and a corresponding set of modified rankings for a given modified feature (or group of features), analysis apparatus 204 aggregates the calculated rank-biased overlaps 228 into an importance score (e.g., importance scores 230) for the feature(s). For example, analysis apparatus 204 calculates a "similarity score" of a feature as the average rank-biased overlap between the set of modified rankings produced from modified feature values 222 for the feature and a corresponding set of original rankings 250. Analysis apparatus 204 then uses the similarity score as an importance score for the feature, where a higher similarity score indicates a lower impact of the feature on rankings outputted by the machine learning model and a lower similarity score indicates a higher impact of the feature on the rankings. Analysis apparatus 204 optionally subtracts the similarity score from 1 to obtain an alternative version of the importance score that is directly proportional to the impact of the feature on the rankings (i.e., a higher importance score indicates a greater impact of the feature on the rankings and a lower importance score indicates a lower impact of the feature on rankings).

Simplification apparatus 202 uses importance scores 230 and a feature removal threshold 232 to identify a set of high-importance features 238 used by baseline version 208. In some embodiments, high-importance features 238 include a subset of features used by baseline version 208 with importance scores 230 that meet or exceed feature removal threshold 232, which represents a minimum impact on rankings outputted by baseline version 208. For example, simplification apparatus 202 identifies high-importance features 238 as a predetermined number of features with importance scores 230 that indicate the largest impact on rankings produced by baseline version 208 (e.g., 50 features with the highest importance scores 230, 20% of features with the highest importance scores 238, etc.) and/or a variable number of features with importance scores 238 that exceed a numeric threshold (e.g., all features with importance scores that exceed 0.01).

In some embodiments, simplification apparatus 202 selects and/or tunes feature removal threshold 232 based on a comparison of baseline resource overhead 216 for baseline version 208 with a target resource overhead 218 for the machine learning model. In some embodiments, baseline resource overhead 216 includes a latency, processor usage, memory footprint, garbage collection duration, and/or another measure of resource or runtime overhead for baseline version 208, and target resource overhead 218 includes a target value of the measure for the machine learning model. For example, target resource overhead 218 includes a performance limit for the machine learning model, which is specified in a SLA for the machine learning model and/or a service that utilizes the machine learning model.

In some embodiments, simplification apparatus 202 sets feature removal threshold 232 to an estimated number of features to be removed from baseline version 208 to lower baseline resource overhead 216 to target resource overhead 218. For example, simplification apparatus 202 retrieves, from model repository 236 and/or another data store, historical resource overheads of different versions of the machine learning model (e.g., different baseline versions that have been updated over time). Simplification apparatus 202 uses a model or formula to estimate a "typical" (e.g., average, median, etc.) per-feature resource overhead for the machine learning model (e.g., by dividing a difference in resource overhead between two versions of the machine learning model by the difference in the number of features between the versions). Simplification apparatus 202 then calculates feature removal threshold 232 by dividing the difference between baseline resource overhead 216 and target resource overhead 218 by the typical per-feature resource overhead and rounding the result to the next highest whole number.

Training apparatus 210 trains a simplified version 214 of the machine learning model using only high-importance features 238 identified by simplification apparatus 202. For example, training apparatus 210 removes inputs, layers, processing nodes, and/or other components that do not involve high-importance features 238 from baseline version 208. Training apparatus 210 then trains the remainder of baseline version 208 using values of high-importance features 238 (and derived features that are created from high-importance features 238) and the corresponding labels from feature repository 234.

In some embodiments, simplification apparatus 202, analysis apparatus 204, and/or another component of the system calculate importance scores 230 and/or identify high-importance features 238 by analyzing primary features in feature repository 234. These primary features are extracted directly from fields or records in profile data, user activity data, sensor data, and/or other data that is available as input into the machine learning model. After high-importance features 238 are identified from the corresponding importance scores 230, the component identifies the subset of primary features excluded from high-importance features 238 and uses a dependency graph and/or feature-transformation metadata for the primary features to identify a set of derived features that are calculated from the excluded primary features (e.g., by aggregating, scaling, combining, bucketizing, or otherwise transforming the excluded features). The component then adds the derived features to the excluded features, thereby removing all features that are calculated from the excluded features from workflows or pipelines for training and executing simplified version 214.

In one or more embodiments, training apparatus 210 further reduces overhead and/or complexity associated with the machine learning model by generating a compressed baseline version 212 of the machine learning model from baseline version 208 and creating simplified version 214 from compressed baseline version 212. For example, training apparatus 210 creates compressed baseline version 212 by applying weight quantization, knowledge distillation, weight pruning, tensor decomposition, and/or another compression technique to one or more deep learning layers in baseline version 212. In another example, training apparatus 210 creates compressed baseline version 212 by applying significance testing to nodes in one or more tree-based portions of baseline version 212 and pruning a subset of nodes that are determined to lack statistical significance in being predictive. Training apparatus 210 then creates simplified version 214 by retraining compressed baseline version 212 with only high-importance features 238 (e.g., from a training dataset for the machine learning model). Alternatively, training apparatus 210 first trains simplified version 214 from an uncompressed baseline version 208 and applies compression to simplified version 214 after simplified version 214 is created.

After compressed baseline version 212, simplified version 214, and/or another version of the machine learning model are created, training apparatus 210 stores parameters of each version in a model repository 236. For example, training apparatus 210 replaces old values of the parameters in model repository 236 with the updated parameters, or training apparatus 210 stores the updated parameters separately from the old values (e.g., by storing each set of parameters with a different version number for the corresponding version). In turn, analysis apparatus 204, simplification apparatus 202, management apparatus 206, and/or another component of the system may retrieve each version of the machine learning model from model repository 236 and/or training apparatus 210.

After simplified version 214 is created, management apparatus 206 verifies that the resource overhead of simplified version 214 meets target resource overhead 218. For example, management apparatus 206 executes simplified version 214 in the same production environment as baseline version 208 and/or in a replica of the production environment and measures the resource overhead of simplified version 214 in the environment (e.g., as the latency, processor consumption, memory footprint, etc. of simplified version 214 during processing of one or more scoring requests). If the resource overhead of simplified version 214 exceeds target resource overhead 218, management apparatus 206 retrains simplified version 214 with additional features removed from high-importance features 238 until the resource overhead of simplified version 214 meets or falls below target resource overhead.

Once the resource overhead of simplified version 214 is determined to meet or fall below target resource overhead 218, management apparatus 206 replaces at least a portion of execution of baseline version 208 in the production environment with the execution of simplified version 214 to produce new rankings with a lower resource overhead. For example, management apparatus 206 gradually directs production traffic from baseline version 208 to simplified version 214 in a series of "ramp-ups" of simplified version 214.

During (or before) ramping up of simplified version 214, management apparatus 206 performs one or more comparisons 226 of a baseline performance 240 of baseline version 208 with a simplified performance 242 of simplified version 214 and uses the result of comparisons to adjust a baseline execution 260 of baseline version 208 and/or a simplified execution 262 of simplified version 214 in the production environment to produce new rankings, which can include baseline rankings 256 from baseline version 208 and/or simplified rankings 258 from simplified version 214. In some embodiments, management apparatus 206 uses one or more online and/or offline experiments to collect and compare performance metrics that are indicative of baseline performance 240 and simplified performance 242.

During an online experiment, both baseline version 208 and simplified version 214 are deployed in the production environment, a first set of users in the online system is exposed to baseline rankings 256 produced by baseline version 208, and a second set of users in the online system is exposed to simplified rankings 258 produced by simplified version 214. Baseline outcomes 244 between the first set of users and items in the corresponding baseline rankings 256 are collected, and simplified outcomes 246 between the second set of users and items in the corresponding simplified rankings 258 are collected. Baseline performance 240 is determined by calculating a performance metric for baseline version 208 as the rate of positive outcomes for users exposed to baseline rankings 256, and simplified performance 242 is determined by calculating a performance metric for simplified version 214 as the rate of positive outcomes for users exposed to simplified rankings 258. For example, the performance metric is calculated for each version as the unique number of users contributing likes, shares, comments, or other types of interaction with rankings of content items in a content feed after the rankings are produced by the version.

An A/B test is then used to determine, based on a comparison (e.g., comparisons 226) of the performance metric between baseline version 208 and simplified version 214, whether or not simplified version 214 has a statistically significant lower performance than baseline version 208 (e.g., based on a predetermined significance level of 0.05, 0.01, and/or another value selected by users conducting the experiment or managing the machine learning model). If simplified version 214 is determined to not have a statistically significant lower performance than baseline version 208, the proportion of users exposed to rankings produced by simplified version 214 is increased, and baseline execution 260 of baseline version 208 is gradually replaced with simplified execution 262 of simplified version 214 in the production environment to reduce the resource overhead of the machine learning model in producing new rankings. If simplified version 214 is determined to have a statistically significant lower performance than baseline version 208, exposure of users in the online system to rankings produced by simplified version 214 is reduced and/or discontinued, and baseline execution 260 of baseline version 208 is maintained or increased to produce new baseline rankings 260 that are outputted to users of the online system.

During an offline experiment, baseline version 208 is executed in the production environment, a first set of users in the online system is exposed to baseline rankings 256 produced by baseline version 208, and a second set of users is exposed to randomly generated rankings. A performance metric for baseline version 208 is calculated as the rate of positive baseline outcomes 244 between the first set of users and the corresponding baseline rankings 256 from baseline version 208, and a performance metric for simplified version 214 is calculated as the rate of positive outcomes between the second set of users and randomly generated rankings that match simplified rankings 258 produced by simplified version 214. As with the online experiment, an A/B test is then used to perform comparisons 226 that determine the statistical significance of a difference between baseline performance 240 and simplified performance 242. If simplified version 214 is determined to have a statistically significant lower performance than baseline version 208, baseline execution 260 of baseline version 208 is continued in the production environment to produce new rankings 244 that are outputted to users of the online system. If simplified version 214 is determined to not have a statistically lower performance than baseline version 208, ramping up of simplified execution 262 of simplified version 214 in the production environment may be initiated.

Management apparatus 206 also, or instead, provides the results of comparisons 226 to simplification apparatus 202, and simplification apparatus 202 adjusts feature removal threshold 232 based on the results. For example, simplification apparatus 202 reduces the number of features to be removed from baseline version 208 when simplified version 214 is determined to have a statistically significant lower performance than baseline version 208 in one or more performance metrics. The reduction in the number of features to be removed may be performed based on predetermined "step sizes" (e.g., feature removal threshold 232 is incrementally lowered so that five fewer features are removed from baseline version 208 every time simplified version 214 has significantly lower performance than baseline version 208). The reduction in the number of features to be removed may also, or instead, be determined based on the magnitude of the difference between baseline performance 240 and simplified performance 242 (e.g., feature removal threshold 232 is lowered so that one fewer feature is removed from baseline version 208 for each "unit" reduction in baseline performance 240 found in simplified performance 242).

After feature removal threshold 232 is adjusted (e.g., to reduce the number of features removed from baseline version 208), training apparatus 206 retrains simplified version 214 with high-importance features 238 that exclude the reduced number of features with the lowest importance scores 230 from baseline version 208. Management apparatus 206 then performs one or more additional rounds of comparisons 226 of baseline performance 240 with simplified performance 242 of the retrained simplified version 214. Once a given simplified version 214 is determined to not have statistically significant lower performance than baseline version 208, management apparatus 206 begins or increases simplified execution 262 of simplified version 214 in lieu of baseline execution 260 of baseline version 208 to produce new rankings in the online system.

In one or more embodiments, management apparatus 206 uses multiple performance metrics to perform comparisons 226 of baseline performance 240 with simplified performance 242 and determine the proportions by which baseline version 208 and simplified version 214 are executed to produce new baseline rankings 256 and/or simplified rankings 258. Simplification apparatus 202 also, or instead, uses one or more combinations of the performance metrics to select feature removal threshold 232.

For example, training apparatus 210 periodically (e.g., every week, two weeks, month, etc.) retrains a new baseline version 208 and/or simplified version 214 of the machine learning model (e.g., using the latest feature values from feature repository 234 and/or the latest importance scores 230 calculated from the feature values). Next, management apparatus 206 calculates a "primary" performance metric for each of baseline version 208 and simplified version 214 as the unique number of users contributing likes, shares, comments, or other types of interaction with rankings of content items in a content feed after the rankings are produced by the corresponding version. Management apparatus 206 also calculates a number of "secondary" performance metrics for both baseline version 208 and simplified version 214. These secondary performance metrics include, but are not limited to, a frequency of usage of the online system (e.g., number of sessions, session length, etc.) for users exposed to content (e.g., search results, recommendations, content feeds, etc.) that reflects rankings outputted by each version, a recency of content in rankings outputted by each version (e.g., the average number of minutes, hours, or days since content in a given ranking was created), a rate of content creation in the online system (e.g., the average number of new posts for users exposed to rankings outputted by each version), and/or an amount of use of a feature in the online system (e.g., the average number of sessions and/or average session length with a "company" or "groups" feature in the online system for users exposed to rankings outputted by each version).

Continuing with the above example, management apparatus 206 uses one or more online and/or offline experiments to perform comparisons 226 of both the primary and secondary performance metrics for baseline version 208 and simplified version 214. When the experiment(s) determine that simplified version 214 has a statistically significant lower primary performance metric than baseline version 208, management apparatus 206 discontinues use of simplified version 214 in generating new simplified rankings 258 that are outputted to users of the online system, and simplification apparatus 202 adjusts feature removal threshold 232 so that more features are included in high-importance features 238. Training apparatus 210 then retrains simplified version 214 to have the greater number of high-importance features 238 and fewer missing features from baseline version 208, and management apparatus 206 performs additional experiments to generate comparisons 226 of simplified performance 242 of the retrained simplified version 214 with baseline performance 240 of baseline version 208. When the experiment(s) determine that simplified version 214 has a statistically significant lower secondary performance metric than baseline version 208, management apparatus 206 maintains the proportion of traffic processed by simplified version 214 and reduces the number of features to be removed from baseline version 208 in the next scheduled retraining of simplified version 214.

In other words, the system of FIG. 2 manages the creation and/or execution of simplified version 214 from a reduced set of features in baseline version 208 in a way that balances the tradeoff between resource overhead and performance in the machine learning model. If simplified version 214 meets target resource overhead 218 and has performance metrics that are not significantly worse than those of baseline version 208, the system ramps up use of simplified version 214 in generating new rankings in the production environment. If simplified version 214 does not meet target resource overhead 218 and does not have a significantly lower performance than baseline version 208, the system retrains simplified version 214 with fewer high-performance features 238 from baseline version 208 and/or using a greater amount of compression. If simplified version 214 meets target resource overhead 218 and has a significantly worse performance than baseline version 208, the system retrains simplified version 214 with a greater number of high-performance features 238 from baseline version 208 and/or using a lower amount of compression. Finally, if simplified version 214 does not meet target resource overhead 218 and has a significantly lower performance than baseline version 208, the system uses one or more predefined rules and/or heuristics to manage subsequent training and/or execution of baseline version 208 and/or simplified version 214; adjusts target resource overhead 218 and/or allows simplified performance 242 to be within a certain interval below baseline performance 240; and/or uses manual input (e.g., from a developer and/or administrator of the machine learning model or service that executes the machine learning model) to prioritize the resource overhead or performance of simplified version 214.

Because simplified version 214 includes fewer features, components, and/or operations than baseline version 208, simplified version 214 involves significantly less complexity and/or resource overhead than baseline version 208. At the same time, selective execution of baseline version 208 and simplified version 214 based on comparisons 226 of performance metrics between the two versions ensures that simplified version 214 does not negatively impact outcomes and/or goals related to use of the machine learning model.

For example, an experiment was performed to compare baseline version 208 of a machine learning model that uses 120 features to rank content items in a content feed with a corresponding simplified version 214 that lacks 10 features with the lowest importance scores 230 from baseline version 208. The experiment determined that simplified version 214 improved queries per second (QPS) by 0.26, reduced the $99^{th}$ percentile latency of baseline version 208 by 2.44%, reduced the $99^{th}$ percentile latency of baseline version 208 on mobile devices by 1.07%, reduced the $90^{th}$ percentile garbage collection duration from 131.3 ms to 103.2 ms, and reduced processor utilization from 15.72% to 11.15%. The experiment also determined that simplified version 214 had better performance metrics for user engagement with the content feed than baseline version 208, despite using fewer features. Consequently, simplified version 214 improved both the runtime performance and predictive performance of the machine learning model, when compared with baseline version 208.

Those skilled in the art will appreciate that the system of FIG. 2 may be implemented in a variety of ways. First, analysis apparatus 204, training apparatus 210, management apparatus 206, feature repository 234, and/or model repository 236 may be provided by a single physical machine, multiple computer systems, one or more virtual machines, a grid, one or more databases, one or more filesystems, and/or a cloud computing system. Analysis apparatus 204, training apparatus 210, and management apparatus 206 may additionally be implemented together and/or separately by one or more hardware and/or software components and/or layers.

Second, a number of metrics and/or techniques may be used to calculate importance scores 230, resource overhead, performance metrics, and/or other parameters that influence the creation of simplified version 214 from baseline version 208. For example, importance scores 230 may be calculated by aggregating Kendall rank correlation coefficients, Spearmans' rank correlation coefficients, and/or other rank similarity measures calculated between original rankings 250 and modified rankings 252-254. In another example, baseline resource overhead 216, target resource overhead 218, and/or the resource overhead of simplified version 214 may be specified in terms of latency, QPS, error rate, processor utilization, memory usage, garbage collection duration, heap utilization, timeout counts, and/or other types of system performance metrics. In a third example, baseline performance 240 and simplified performance 242 may include, but are not limited to, session counts, session lengths, click-through rates (CTRs), conversion rates, message counts, searches, and/or other measures of user engagement or activity with the online system.

Figure 3:
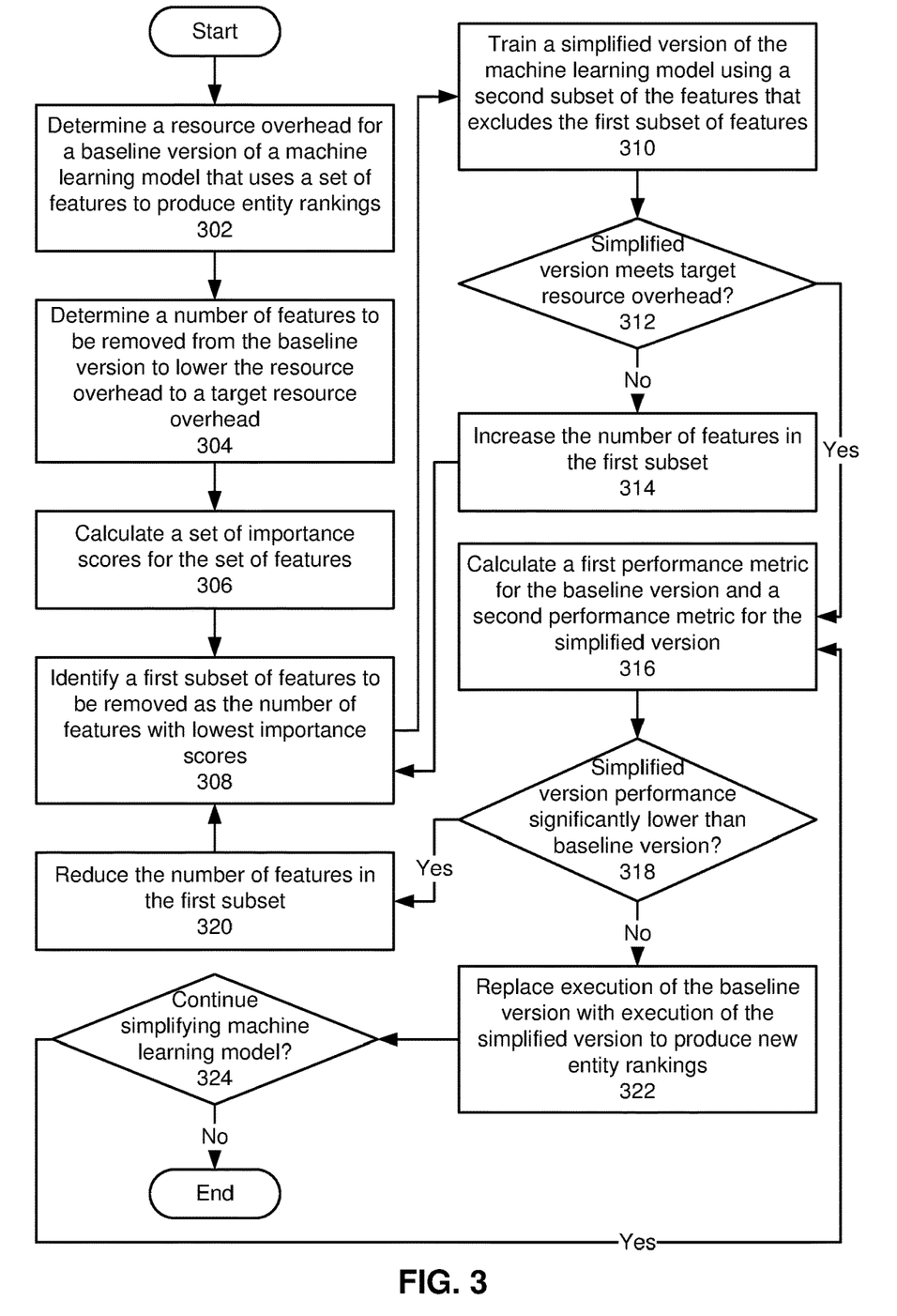
FIG. 3 shows a flowchart illustrating a process of streamlining the execution of a machine learning model in accordance with the disclosed embodiments.

FIG. 3 shows a flowchart illustrating a process of streamlining the execution of a machine learning model in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a resource overhead for a baseline version of a machine learning model that uses a set of features to produce entity rankings is determined (operation 302). For example, the resource overhead includes a latency, processor usage, memory footprint, garbage collection duration, and/or another measure of computational resource consumption for the baseline version.

Next, a number of features to be removed from the baseline version to lower the resource overhead to a target resource overhead is determined (operation 304). For example, the target resource overhead includes an upper limit to the resource overhead of the machine learning model, as specified in an SLA for the machine learning model. The target resource overhead is also, or instead, calculated as a proportion or percentage of the resource overhead of the baseline version. The "per-feature" resource overhead of the baseline version is estimated from differences in the number of features and resource overhead of the baseline version over time (e.g., as features are added to or removed from the baseline version), and the number of features to be removed from the baseline version is calculated as the difference between the resource overhead of the baseline version and the target resource overhead divided by the per-feature resource overhead, rounded up to the nearest whole number.

A set of importance scores is calculated for the set of features (operation 306). As described in further detail with respect to FIG. 4, each importance score represents an impact of a corresponding feature on the entity rankings produced by the baseline version. A first subset of features to be removed is also identified as the number of features with lowest importance scores (operation 308). For example, the first subset of features includes the number of features with the lowest impact on the entity rankings produced by the baseline version.

A simplified version of the machine learning model is then trained using a second subset of the features that excludes the first subset of features (operation 310). For example, the simplified version is trained using the architecture of the baseline version and remaining features used by the baseline version that exclude the number of features with lowest importance scores identified in operation 308. Because fewer features are calculated, retrieved, and/or processed using the simplified version, the resource overhead of the simplified version is lower than that of the baseline version. To further reduce complexity and/or overhead in the simplified version, a model-compression technique is optionally applied to the baseline version prior to training the simplified version and/or to the simplified version after the simplified version is trained.

After the simplified version is created, the resource overhead of the simplified version is compared with the target resource overhead to determine whether or not the simplified version meets the target resource overhead (operation 312). For example, the simplified version is executed in the same environment as the baseline version or in a replica of the environment, and the resource overhead of the simplified version in the environment is compared to the target resource overhead. If the simplified version meets the target resource overhead, no additional processing related to the resource overhead of the simplified version is required.

If the simplified version does not meet the target resource overhead, the number of features in the first subset is increased (operation 314), and operations 308-310 are repeated to retrain the simplified version using a smaller number of remaining features from the baseline version. Operations 312-314 are also repeated until the resource overhead of the simplified version meets the target resource overhead of the machine learning model.

After the simplified version is determined to meet the target resource overhead, a first performance metric is calculated for the baseline version, and a second performance metric is calculated for the simplified version (operation 316). For example, an offline experiment is used to determine a first set of outcomes from exposure of a first set of users in an online system to a first set of rankings outputted by the baseline version and a second set of outcomes from exposure of a second set of users in the online system to randomly generated rankings that match a second set of rankings outputted by the simplified version. In another example, an online experiment is used to output the first set of rankings produced by the baseline version to a first set of users, output the second set of rankings produced by the simplified version to a second set of users, and monitor the first and second sets of outcomes during use of the online system by the first and second sets of users. In both examples, the first performance metric is calculated as the rate of positive outcomes (e.g., clicks, saves, likes, comments, shares, and/or other actions indicating user engagement) between the first set of users and the first set of rankings, and the second performance metric is calculated as the rate of positive outcomes between the second set of users and the second set of rankings.

The first and second performance metrics are compared to determine whether or not the performance of the simplified version is significantly lower than the baseline version (operation 318). For example, an A/B test or another type of statistical significance test is used to determine the statistical significance of a difference between the first and second performance metrics. If the result of the test includes a second performance metric that is lower than the first performance metric and a p-value that is lower than or equal to a predetermined significance level, the simplified version is determined to have a statistically significant lower performance than the baseline version. If the second performance metric is not lower than the first performance metric or the p-value is greater than the significance level, the simplified version is determined to not have a statistically significant lower performance than the baseline version.

When the simplified version has a statistically significant lower performance than the baseline version, the number of features in the first subset is reduced (operation 320), and operations 308-310 are performed to retrain the simplified version using a greater number of features from the baseline version. Operations 312-318 are then repeated to verify that the retrained simplified version both meets the target resource overhead and does not have a statistically significant lower performance than the baseline version. When the simplified version has a significantly lower performance than the baseline version and cannot meet the target resource overhead, one or more rules and/or manual input are used to select the number of features to be removed from the baseline version, the level of compression in the simplified version, and/or other parameters related to creation of the simplified version from the baseline version.

When the simplified version does not have a statistically significant lower performance than the baseline version, execution of the baseline version is replaced with execution of the simplified version to produce new entity rankings (operation 322). For example, execution of the simplified version in a production environment to generate new entity rankings that are outputted to users of the online system is incrementally ramped up. As execution of the simplified version is incrementally increased, execution of the baseline version in the production environment is correspondingly decreased.

In one or more embodiments, multiple performance metrics are monitored and compared between the baseline and simplified versions, and different types of actions are taken based on the results of the comparisons. For example, performance metrics for a given version (e.g., baseline, simplified, etc.) of the machine learning model that generates rankings of content for display in a content feed include a "primary" performance metric that measures the unique number of users contributing likes, shares, comments, or other types of interaction with rankings produced by the version. The performance metrics additionally include a number of "secondary" performance metrics that include, but are not limited to, a frequency of usage of the online system (e.g., number of sessions, session length, etc.) for users exposed to the rankings outputted by the version, a recency of content in the rankings (e.g., the average number of minutes, hours, or days since content in a given ranking was created), a rate of content creation in the online system (e.g., the average number of new posts for users exposed to the rankings), and/or the amount of use of a feature in the online system (e.g., the average number of sessions and/or session length with a "company" or "groups" feature in the online system for users exposed to the rankings).

Continuing with the above example, if the simplified version has a statistically significant lower primary performance metric than the baseline version, execution of the simplified version to generate new rankings that are outputted to users of the online system is discontinued, and the simplified version is retrained to have fewer missing features from the baseline version. If the simplified version does not have a statistically significant lower primary performance metric than the baseline version but has a statistically significant lower secondary performance metric than the baseline version, the proportion of traffic processed by the simplified version is maintained (or optionally reduced), and the number of features to be removed from the baseline version is reduced during a scheduled retraining of the next simplified version (e.g., on a weekly, biweekly, or monthly basis). If the simplified version does not have significantly lower primary or secondary performance metrics than the baseline version, ramping up of the simplified version in the production environment continues according to a predetermined ramping schedule and/or ramp-up amounts (e.g., an additional 5% of traffic per ramp-up, which occurs on a daily or weekly basis).

The machine learning model may continue to be simplified (operation 324). During such simplification, performance metrics for the baseline and simplified versions continue to be calculated and compared (operations 316-318) to verify that the simplified version does not have a significantly lower performance than the baseline version. When the simplified version has a significantly lower performance than the baseline version, the number of features to be removed from the baseline version is reduced (operation 320), and the simplified version is retrained a subset of features that excludes the reduced number of features (operations 308-310). The resource overhead of the retrained simplified version is also compared with the target resource overhead (operation 312). If the simplified version does not meet the target resource overhead, the number of features in the first subset is increased (operation 314), and the simplified version is retrained using a smaller second subset of features (operations 308-310). Such monitoring of the simplified version's resource overhead and performance, adjusting of the number of features from the baseline version to be excluded from the simplified version, and/or execution of the simplified version may thus continue until the simplified version is no longer used to streamline the execution of the machine learning model (e.g., if execution of the machine learning model is discontinued and/or the simplified version does not improve the resource overhead of the machine learning model without significantly lowering the performance of the machine learning model).

Figure 4:
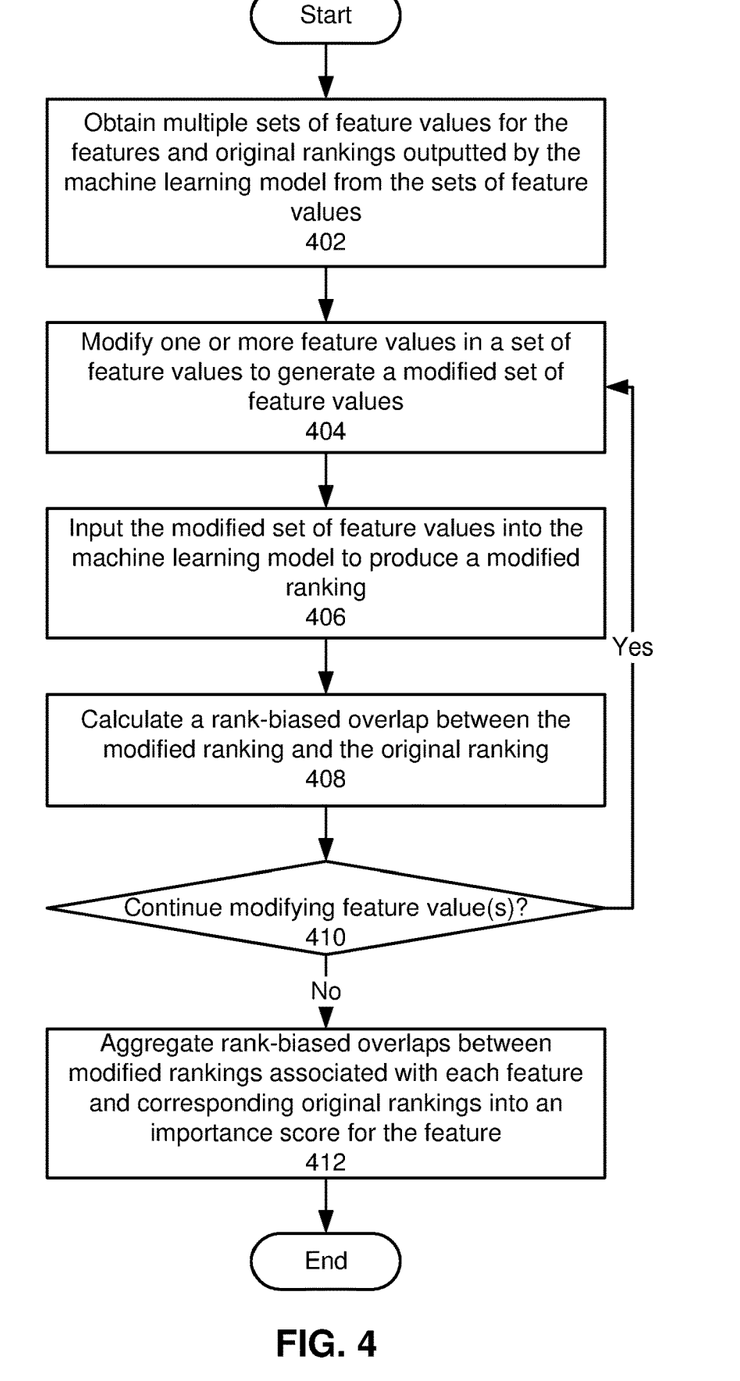
FIG. 4 shows a flowchart illustrating a process of calculating importance scores for features used by a machine learning model in accordance with the disclosed embodiments.

FIG. 4 shows a flowchart illustrating a process of calculating importance scores for features used by a machine learning model in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, multiple sets of feature values for the features and original rankings outputted by the machine learning model from the sets of feature values are obtained (operation 402). For example, the sets of feature values may be obtained from records in a training, test, validation, and/or other dataset used to create or evaluate the machine learning model. Each set of feature values may be inputted into the machine learning model, and a corresponding original ranking may be obtained as output from the machine learning model.

Next, one or more feature values in a set of feature values is modified to generate a modified set of feature values (operation 404). For example, the modified set of feature values is created by replacing one or more feature values in the set with a default missing value that minimizes the effect of the corresponding feature(s) on the output of the machine learning model. In another example, each feature value to be modified is swapped with another feature value for the same feature from a different set of feature values (e.g., a different record in the same dataset). Thus, the modified set of feature values contains the same feature values as the original set of feature values, with the exception of the feature value(s) that have been replaced with default missing values or swapped with other feature values from a different set of feature values.

The modified set of feature values is inputted into the machine learning model to produce a modified ranking (operation 406), and a rank-biased overlap between the modified ranking and the original ranking is calculated (operation 408). As a result, the rank-biased overlap represents the extent to which the modified feature value(s) affect the ranking outputted by the machine learning model.

Operations 404-408 are repeated while modification of feature values continues (operation 410). For example, each feature value (or group of feature values) in a given set of feature values is modified one or more times (operation 404), so that each set of feature values results in multiple modified sets of feature values and each modified set of feature values produced from a given set of feature values contains a different subset of modified feature values. Operations 406-408 are then performed for each of the modified sets of feature values to measure the effect of the modified feature(s) on the ranking outputted by the machine learning model. Such modification of feature values may be repeated to generate modified sets of feature values from a certain number of sets of feature values, generate a certain number of sets of modified feature values from each set of feature values, and/or modify a certain number of features or groups of features in each set of feature values.

Finally, rank-biased overlaps between modified rankings associated with each feature and the corresponding original rankings are aggregated into an importance score for the feature (operation 412). For example, a similarity score for each feature is calculated by aggregating the rank-biased overlaps between modified rankings produced by the machine learning model after values of the feature are modified and the corresponding original rankings, and an importance score for the feature is calculated by subtracting the similarity score from 1. As a result, a higher importance score indicates a higher impact of the feature on rankings produced by the machine learning model, and a lower importance score indicates a lower impact of the feature on the rankings. The importance scores may then be used to selectively remove features from a baseline version of the machine learning model, as discussed above.

Figure 5:
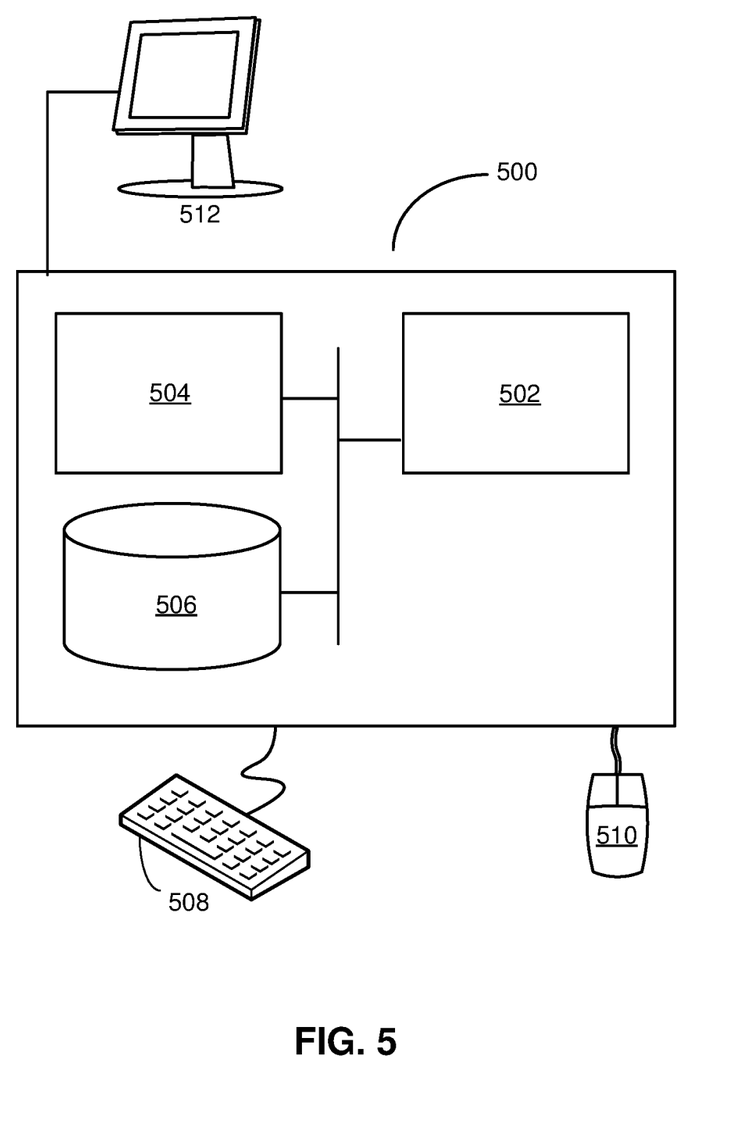
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 also includes input/output (I/O) devices such as a keyboard 508, a mouse 510, and a display 512.

Computer system 500 includes functionality to execute various components of the present embodiments. In particular, computer system 500 includes an operating system (not shown) that coordinates the use of hardware and software resources on computer system 500, as well as one or more applications that perform specialized tasks for the user. To perform tasks for the user, applications obtain the use of hardware resources on computer system 500 from the operating system, as well as interact with the user through a hardware and/or software framework provided by the operating system.

In one or more embodiments, computer system 500 provides a system for streamlining machine learning. The system includes an analysis apparatus, a training apparatus, a simplification apparatus, and a management apparatus, one or more of which may alternatively be termed or implemented as a module, mechanism, or other type of system component. The simplification apparatus determines a resource overhead for a baseline version of a machine learning model that uses a set of features to produce entity rankings and a number of features to be removed to lower the resource overhead to a target resource overhead. Next, the analysis apparatus calculates importance scores for the features, wherein each importance score represents an impact of a corresponding feature on the entity rankings. The simplification apparatus then identifies a first subset of the features to be removed as the number of features with lowest importance scores, and the training apparatus trains a simplified version of the machine learning model using a second subset of the features that excludes the first subset of the features.

The management apparatus calculates a first performance metric for the baseline version based on a first set of outcomes related to a first set of rankings outputted by the baseline version and a second performance metric for the simplified version based on a second set of outcomes related to a second set of rankings outputted by the simplified version. When a comparison of the first and second performance metrics indicates that the simplified version does not have a statistically significant lower performance than the baseline version, the management apparatus replaces execution of the baseline version with execution of the simplified version to produce new entity rankings.

In addition, one or more components of computer system 500 may be remotely located and connected to the other components over a network. Portions of the present embodiments (e.g., analysis apparatus, training apparatus, simplification apparatus, management apparatus, data repository, model repository, online network, etc.) may also be located on different nodes of a distributed system that implements the embodiments. For example, the present embodiments may be implemented using a cloud computing system that streamlines the execution of machine learning models on a remote online system.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    creating a baseline version of a machine learning model by training the machine learning model with a first set of feature values for a first set of features;
    deploying the baseline version in an environment, wherein the deployed baseline version outputs a first set of entity rankings;
    creating a second set of feature values for the first set of features by replacing at least one first value of the first set of feature values with at least one second value different from the at least one first value, wherein the at least one second value is configured to minimize a contribution of the first set of features to output of the machine learning model;
generating a second set of entity rankings by applying the baseline version to the second set of feature values;
computing a similarity score between the first set of entity rankings and the second set of entity rankings;
identifying a set of high-importance features based on the similarity score, wherein the set of high-importance features comprises a subset of the first set of features;
creating a simplified version of the machine learning model by training the machine learning model with the set of high-importance features instead of the first set of features;
determining a resource overhead for the simplified version by executing the simplified version in the environment or in a replica of the environment; and
in response to the resource overhead satisfying a target resource overhead, replacing at least a portion of the deployed baseline version with the simplified version in the environment, wherein the simplified version outputs a second set of entity rankings different from the first set of entity rankings.

2. The method of claim 1, further comprising:
calculating a first performance metric for the baseline version based on a first set of outcomes related to a first set of rankings outputted by the baseline version;
calculating a second performance metric for the simplified version based on a second set of outcomes related to a second set of rankings outputted by the simplified version; and
when a comparison of the first and second performance metrics indicates that the simplified version has a statistically significant lower performance than the baseline version:
removing features with lowest important scores from the set of features; and
retraining the simplified version using a third subset of the features that does not include the features with the lowest importance scores.

3. The method of claim 2, wherein calculating and comparing the first and second performance metrics comprises:
outputting the first set of rankings to a first set of users and the second set of rankings to a second set of users;
monitoring the first and second sets of outcomes during use of an online system by the first and second sets of users; and
calculating the first and second performance metrics and a statistical significance of a difference between the first and second performance metrics from the first and second sets of outcomes.

4. The method of claim 2, wherein the first and second performance metrics comprise a rate of positive outcomes between a set of users and a corresponding set of rankings outputted by a version of the machine learning model.

5. The method of claim 2, further comprising:
performing an additional comparison of one or more additional performance metrics between the baseline and simplified versions of the machine learning model; and
adjusting a number of features to be removed from the set of features based on the additional comparison prior to retraining the simplified version.

6. The method of claim 5, wherein the one or more additional performance metrics comprise at least one of:
a frequency of usage of an online system;
a recency of content in entity rankings;
a rate of content creation in the online system; and
an amount of use of a feature in the online system.

7. The method of claim 1, further comprising calculating a set of importance scores for the set of features inputted into the baseline version by:
obtaining a first set of feature values for the set of features;
by the baseline version, outputting an original ranking based on the first set of feature values;
modifying one or more feature values in the first set of feature values;
inputting, into the baseline version, the modified one or more feature values;
by the baseline version, outputting a modified ranking based on the modified one or more feature values; and
calculating an importance score for one or more features represented by the modified one or more feature values using a rank-biased overlap between the modified ranking and the original ranking.

8. The method of claim 7, wherein modifying the one or more feature values comprises at least one of:
replacing, in the first set of feature values, a first feature value of a feature with a second feature value of the feature from a second set of values for the set of features; and
replacing a third feature value in the first set of feature values with a default missing value.

9. The method of claim 1, wherein training the simplified version comprises:
compressing the baseline version; and
retraining the compressed baseline version with the first subset of the features removed.

10. The method of claim 1, further comprising determining the first subset of the features with less than a threshold impact on the ranking of entities by importance scores outputted by the baseline version by:
for each primary feature in the first subset of the features, identifying one or more derived features that depend on the primary feature; and
adding the one or more derived features to the first subset of the features.

11. The method of claim 1, wherein the resource overhead comprises at least one of:
a latency;
a processor utilisation;
a memory usage; and
a garbage collection duration.

12. The method of claim 1, wherein:
each of the entity rankings comprises an ordering of content items by scores outputted by the machine learning model; and
each of the scores represents a predicted likelihood of a user performing an action on a content item.

13. A system, comprising:
one or more processors; and
memory storing instructions that, when executed by the one or more processors, cause the system to perform operations comprising:
creating a baseline version of a machine learning model by training the machine learning model with a first set of feature values for a first set of features;
deploying the baseline version in an environment, wherein the deployed baseline version outputs a first set of entity rankings;

creating a second set of feature values for the first set of features by replacing at least one first value of the first set of feature values with at least one second value different from the at least one first value, wherein the at least one second value is configured to minimize a contribution of the first set of features to output of the machine learning model;
generating a second set of entity rankings by applying the baseline version to the second set of feature values;
computing a similarity score between the first set of entity rankings and the second set of entity rankings;
identifying a set of high-importance features based on the similarity score, wherein the set of high-importance features comprises a subset of the first set of features;
creating a simplified version of the machine learning model by training the machine learning model with the set of high-importance features instead of the first set of features;
determining a resource overhead for the simplified version by executing the simplified version in the environment or in a replica of the environment; and
in response to the resource overhead satisfying a target resource overhead, replacing at least a portion of the deployed baseline version with the simplified version in the environment, wherein the simplified version outputs a second set of entity rankings different from the first set of entity rankings.

14. The system of claim 13, wherein the memory further stores instructions that, when executed by the one or more processors, cause the system to:
determining a resource overhead of the baseline version;
determining a number of features to be removed from the set of features to lower the resource overhead to a target resource overhead for the machine learning model;
calculating a set of importance scores for the set of features, wherein each importance score in the set of importance scores represents an impact of a corresponding feature on the first set of entity rankings; and
identify the second set of feature values as the features with importance scores that indicate less than a threshold impact on the first set of entity rankings.

15. The system of claim 14, wherein the memory further stores instructions that, when executed by the one or more processors, cause the system to:
calculate a first performance metric for the baseline version based on a first set of outcomes related to the first set of entity rankings;
calculate a second performance metric for the simplified version based on a second set of outcomes related to the second set of entity rankings;
when a first comparison of the first and second performance metrics indicates that the simplified version does not have a statistically significant lower performance than the baseline version, execute the simplified version to produce a third set of entity rankings; and
when a second comparison of the first and second performance metrics indicates that the simplified version has a statistically significant lower performance than the baseline version, remove features with lowest importance scores from the set of features.

16. The system of claim 15, wherein the memory further stores instructions that, when executed by the one or more processors, cause the system to:
perform a third comparison of one or more additional performance metrics between the baseline and simplified versions; and
adjust the number of features to be removed from the set of features based on the third comparison.

17. The system of claim 14, wherein the memory further stores instructions that, when executed by the one or more processors, cause the system to perform operations comprising calculating a set of importance scores for the set of features inputted into the baseline version by:
obtaining a first set of feature values for the set of features;
by the baseline version, outputting an original ranking based on the first set of feature values;
modifying one or more feature values in the first set of feature values;
inputting, into the baseline version, the modified one or more feature values;
by the baseline version, outputting a modified ranking based on the modified one or more feature values; and
calculating an importance score for one or more features represented by the modified one or more feature values using a rank-biased overlap between the modified ranking and the original ranking.

18. The system of claim 13, wherein the simplified version is created by:
compressing the baseline version; and
retraining the compressed baseline version with the first subset of the features removed.

19. The system of claim 13, wherein the second set of feature values comprises:
a first set of primary features with less than a threshold impact on the first set of entity rankings; and
a second set of derived features that depend on the first set of primary features.

20. A non-transitory computer-readable storage medium storing instructions that when executed by a computer cause the computer to perform a method, the method comprising:
creating a baseline version of a machine learning model by training the machine learning model with a first set of feature values for a first set of features;
deploying the baseline version in an environment, wherein the deployed baseline version outputs a first set of entity rankings;
creating a second set of feature values for the first set of features by replacing at least one first value of the first set of feature values with at least one second value different from the at least one first value, wherein the at least one second value is configured to minimize a contribution of the first set of features to output of the machine learning model;
generating a second set of entity rankings by applying the baseline version to the second set of feature values;
computing a similarity score between the first set of entity rankings and the second set of entity rankings;
identifying a set of high-importance features based on the similarity score, wherein the set of high-importance features comprises a subset of the first set of features;
creating a simplified version of the machine learning model by training the machine learning model with the set of high-importance features instead of the first set of features;
determining a resource overhead for the simplified version by executing the simplified version in the environment or in a replica of the environment; and
in response to the resource overhead satisfying a target resource overhead, replacing at least a portion of the deployed baseline version with the simplified version in the environment, wherein the simplified version outputs a second set of entity rankings different from the first set of entity rankings.

* * * * *